United States Patent
Konyashin et al.

(10) Patent No.: US 10,781,512 B2
(45) Date of Patent: Sep. 22, 2020

(54) METHOD OF COATING A BODY, GRANULES FOR THE METHOD AND METHOD OF MAKING GRANULES

(71) Applicant: ELEMENT SIX GMBH, Burghaun (DE)

(72) Inventors: Igor Yurievich Konyashin, Burghaun (DE); Daniel Hlawatschek, Burghaun (DE); Bernd Heinrich Ries, Burghaun (DE)

(73) Assignee: Element Six GmbH, Burghaun (DE)

( * ) Notice: Subject to any disclaimer, the term of this patent is extended or adjusted under 35 U.S.C. 154(b) by 0 days.

(21) Appl. No.: 15/302,929

(22) PCT Filed: May 22, 2015

(86) PCT No.: PCT/EP2015/061399
§ 371 (c)(1),
(2) Date: Oct. 7, 2016

(87) PCT Pub. No.: WO2015/181077
PCT Pub. Date: Dec. 3, 2015

(65) Prior Publication Data
US 2017/0029929 A1 Feb. 2, 2017

(30) Foreign Application Priority Data

May 31, 2014 (GB) .................................. 1409694.5

(51) Int. Cl.
| | | |
|---|---|---|
| *C23C 4/067* | (2016.01) | |
| *C23C 4/131* | (2016.01) | |
| *B33Y 10/00* | (2015.01) | |
| *C22C 29/08* | (2006.01) | |
| *C23C 4/06* | (2016.01) | |

(Continued)

(52) U.S. Cl.
CPC ............ *C23C 4/067* (2016.01); *B22F 3/1055* (2013.01); *B22F 9/04* (2013.01); *B22F 9/06* (2013.01);
(Continued)

(58) Field of Classification Search
None
See application file for complete search history.

(56) References Cited

U.S. PATENT DOCUMENTS

| | | | | |
|---|---|---|---|---|
| 4,689,463 A | * | 8/1987 | Shubert | ................ B23K 35/327 |
| | | | | 219/121.36 |
| 2003/0103858 A1 | * | 6/2003 | Baran | ................. C22C 33/0207 |
| | | | | 419/30 |

(Continued)

FOREIGN PATENT DOCUMENTS

| | | |
|---|---|---|
| CN | 1778980 A | 5/2006 |
| GB | 2481911 A | 1/2012 |

(Continued)

OTHER PUBLICATIONS

United Kingdom Patent Application No. GB1409694.5, Combined Search and Examination Report dated Jan. 19, 2015, 6 pages.

(Continued)

*Primary Examiner* — Paul A Wartalowicz
(74) *Attorney, Agent, or Firm* — Dean W. Russell; Clark F. Weight; Kilpatrick Townsend & Stockton LLP

(57) ABSTRACT

A method for coating a body includes providing a plurality of granules in which each granule includes silicon (Si), carbon (C), chromium (Cr) and an iron group metal. The relative quantities of the Si, C and Cr are such that a molten phase will form at a melting temperature of less than 1,300 degrees Celsius when a threshold quantity of the iron group metal is accessible to the Si, C and Cr. A second source of the iron group metal is also provided. A combination of the granules and the second source is formed such that the threshold quantity of the iron group metal will be accessible to the Si, C and Cr. The granules and the second source are heated to the melting temperature to form the molten phase in contact with the body. The heat is then removed to allow the molten phase to solidify.

8 Claims, 8 Drawing Sheets

(51) Int. Cl.
    *C22C 1/05*     (2006.01)
    *C23C 4/134*     (2016.01)
    *B33Y 70/00*     (2020.01)
    *B22F 3/105*     (2006.01)
    *C22C 1/10*     (2006.01)
    *C22C 29/10*     (2006.01)
    *C22C 29/06*     (2006.01)
    *B22F 9/04*     (2006.01)
    *B22F 9/06*     (2006.01)

(52) U.S. Cl.
    CPC .............. *B33Y 10/00* (2014.12); *B33Y 70/00* (2014.12); *C22C 1/051* (2013.01); *C22C 1/1084* (2013.01); *C22C 29/06* (2013.01); *C22C 29/08* (2013.01); *C22C 29/10* (2013.01); *C23C 4/06* (2013.01); *C23C 4/131* (2016.01); *C23C 4/134* (2016.01); *B22F 2003/1056* (2013.01); *B22F 2998/10* (2013.01); *B22F 2999/00* (2013.01); *Y02P 10/295* (2015.11)

(56) References Cited

U.S. PATENT DOCUMENTS

2007/0267390 A1* 11/2007 Jiang .................. C23C 4/12
                                                                             219/121.45
2011/0212825 A1    9/2011   Konyashin et al.
2012/0177828 A1    7/2012   Konyashin et al.
2013/0125872 A1    5/2013   Konyashin et al.
2015/0111065 A1*   4/2015   Konyashin ................ B22F 7/08
                                                                             428/682

FOREIGN PATENT DOCUMENTS

| GB | 2502702 A | 12/2013 |
|---|---|---|
| GB | 2503796 A | 1/2014 |
| WO | 2013178550 A1 | 12/2013 |
| WO | 2013178554 A1 | 12/2013 |

OTHER PUBLICATIONS

International Patent Application No. PCT/EP2015/061399, International Search Report and Written Opinion dated Nov. 19, 2015, 21 pages.

United Kingdom Patent Application No. GB1508804.0, Combined Search and Examination Report dated Feb. 17, 2016, 8 pages.

Chinese Patent Application No. 201580040348.6, Office Action dated Apr. 24, 2019, 17 pages.

* cited by examiner

METHOD OF COATING A BODY, GRANULES FOR THE METHOD AND METHOD OF MAKING GRANULES

CROSS REFERENCE TO RELATED APPLICATIONS

This application is the U.S. national phase of International Application No. PCT/EP2015/061399 filed on May 22, 2015, and published in English on Dec. 3, 2015 as International Publication No. WO 2015/181077 A1, which application claims priority to United Kingdom Patent Application No. 1409694.5 filed on May 31, 2014, the contents of all of which are incorporated herein by reference.

FIELD OF THE INVENTION

This disclosure relates generally to methods of coating a body, particularly but not exclusively for providing a hard coating, granules suitable for use in such methods, and methods of making the granules.

BACKGROUND OF THE INVENTION

International patent application, publication number WO/2013/178550 discloses a method for making a construction comprising a steel substrate body coated with a layer of relatively harder material. The method may include providing a plurality of granules comprising iron (Fe), silicon (Si) and a source of carbon (C), in which the relative quantities of the Fe, Si and C are selected such that the combination of the Fe, Si and C has a phase liquidus temperature of at most about 1,280 degrees Celsius; and depositing the granules onto the substrate body by means of a thermal spray assembly. The thermal spraying process will involve heating the granules to a temperature of at least about 1,350 degrees Celsius at a mean rate of at least about 100 degrees Celsius per second, and the cooling of the granules to less than about 1,000 degrees Celsius at a mean rate of at least about 20 degrees per second on contact with the substrate body.

There is a need to provide a method for thermal deposition of material, granules comprising precursor material for use as feedstock in the thermal deposition process and method of making the granules, particularly but not exclusively where the precursor material may form a molten phase at a relatively low temperature.

SUMMARY OF THE INVENTION

Viewed from a first aspect, there is provided a method of coating a body, the method including providing a plurality of granules, each granule comprising silicon (Si), carbon (C), chromium (Cr) and iron group metal selected from iron (Fe), cobalt (Co) and nickel (Ni); in which the relative quantities of the Si, C and Cr are such that a molten phase comprising the Si, C, Cr and the iron group metal will form at a melting temperature of less than 1,300 degrees Celsius when at least a threshold quantity of the iron group metal is accessible to the Si, C and Cr; each granule comprising substantially less than the threshold quantity of the iron group metal; providing at least a second source of the iron group metal; forming a combination of the granules and the second source such that at least the threshold quantity of the iron group metal will be accessible to the Si, C and Cr; heating the granules and the second source to at least the melting temperature to form the molten phase in contact with the body; and removing the heat to allow the molten phase to solidify and to provide the coated body.

In some examples, the melting temperature may be at most about 1,280 or at most about 1,200 degrees Celsius.

In some examples, the method may include using a laser cladding process, in which the heating is achieved by means of a laser beam; an electron beam process, in which the heating is achieved by means of an electron beam; or an arc plasma spray process, in which the heating is achieved by means of an arc plasma.

In some examples, the method may include using an additive manufacturing process to manufacture an article by building up successive layers of coating, the layers configured for producing the article. For example, the additive manufacturing process may include direct metal laser sintering (DMLS), selective laser sintering (SLS) or electron beam melting (EBM).

In some examples, the content of the iron group metal comprised in the granules may be 20 to 60 percent of the threshold quantity, or 30 to 50 percent of the threshold quantity. In some examples, the granules may comprise at least about 5 or at least about 10 weight percent iron group metal. In some examples, the granules may comprise at most about 30 or at most about 20 weight percent iron group metal.

In some examples, the granules may have a mean grain size of at least about 50 microns. In some examples, the granules may have a mean grain size of at most about 500 microns or at most about 220 microns. The granules may have a mean size of 50 to 500 microns (if the granule is approximately spherical, then the grain size will be approximately the mean diameter).

In some example, the granules may have a mean compressive strength of at least 50 or at least 200 megapascals (MPa). The mean compressive strength of the granules may be at most about 1,000 MPa or at most about 600 MPa.

In some examples, the granules may have a HV10 Vickers hardness of at least about 800; and or at most about 1,500.

In some examples, the second source of the iron group element may be provided in particulate form. The second source of the iron group metal may be in the form of grains comprising or consisting of (apart from minor impurities) the iron group metal; the grain size may be about 50 to about 500 microns. In some examples, the body may comprise a source of the iron group metal.

In some examples, the granules may comprise 20 to 60 percent of a threshold quantity of the iron group metal.

In some examples, the granules may include a plurality of carbide material grains, such as WC grains, which may have mean size of at least 0.1 micron and at most 10 microns. The granules may include a plurality of chromium carbide particles, and or super-hard material. In some examples, the granules may comprise iron (Fe) grains having mean size of 0.5 to 5 microns and $Cr_3C_2$ grains having a mean size of 0.5 to 5 microns.

In some examples, each granule may comprise silicon Si, chromium carbide ($Cr_3C_2$) and iron (Fe); the mass of the chromium carbide ($Cr_3C_2$) being 1.5 to 7 times the mass of the Si, and the mass of the Fe being 2 to 8 times the mass of the Si. In some examples, the mass of the $Cr_3C_2$ may be 1.5 to 5 times the mass of the Si, and the mass of the Fe may be 4 to 6 times the mass of the Si.

In some examples, each granule may comprise at least about 13 weight percent WC grains, 0.1 to 10 weight percent Si (in elemental or chemical compound form), and at least 0.1 to 10 weight percent Cr (in elemental or chemical compound form), and the iron group metal. In some examples, each granule may comprise 1 to 5 weight percent silicon (Si), 5 to 15 weight percent chromium carbide ($Cr_3C_2$), 10 to 30 weight percent iron group metal, and 50 to 95 weight percent metal carbide selected from tungsten carbide (WC), titanium carbide (TiC) or tantalum carbide (TaC).

In some examples, the granules may comprise one or more carbide, carbo-nitride or nitride compound including one or metal selected from the Ti, V, Mn, Zr, Nb, Mo, Hf, Ta and W, or combinations of any two or more of such compounds. The granule may contain at least one grain of super-hard material, such as diamond or cubic boron nitride (cBN)

In some examples, the method may include providing the second source of the iron group metal in particulate form, introducing the granules and the second source into a feeder mechanism of an arc plasma spray apparatus, heating the granules and the second source by means of an arc plasma, and coating the body by means of the apparatus; in which the arc plasma spray apparatus comprises a plasma torch for producing a plasma jet from a plasma nozzle, and the feeder mechanism for guiding the granules into the plasma jet in use, and is capable of providing a feeder orifice when in an open condition; the feeder mechanism comprising a guide chamber and a moveable guide mechanism; and configured such that the guide chamber is capable of guiding the granules to the feeder orifice, through which the granules can move from the guide chamber and enter the plasma jet at a variable mean distance from the plasma nozzle in response to movement of the guide mechanism; the method including adjusting the position of the guide mechanism such that substantially none of the molten phase contacts the apparatus in use. In some examples, the thermal spray apparatus may comprise a plasma transferred arc (PTA) device.

In some examples, the guide mechanism may comprise a sleeve that extends all the way around the plasma torch and is axially moveable relative to the plasma torch, the feeder orifice may be provided as an annular axial gap, a boundary of which is coterminous with a boundary of the sleeve such that the axial gap is variable in response to axial movement of the sleeve; and the method may include arranging the sleeve such that the axial gap of the feeder orifice is 0.2 to 0.5 mm.

In some examples, a method may include applying laser cladding to the granules, which may include defocussing a suitable laser beam on a body to be coated to produce a laser-illuminated spot having a selected area, the laser light incident on the entire spot area delivering sufficient power to melt the precursor material rapidly. The method may include conveying the granules through a nozzle by means of flowing inert gas, onto the surface of the body within the illuminated area, where the precursor material (comprised in the granules) will likely melt and or react rapidly with material comprised in the substrate body. The molten material will likely solidify into a desired phase or phases quite rapidly, and may be referred to as a 'melt pool' while it is still in a molten or partially molten phase within the laser-illuminated area. The laser beam may be moved over the area of the surface of the body that is to be coated, precursor material being introduced onto the moving illuminated area as it does so, thus producing a layer of deposited material which is likely to be strongly joined to the substrate body. A plurality of deposited layers may be built up over each other if the deposition process is repeated.

In some examples, the method may include depositing a plurality of layers on top of each other, in which the granules are transformed into a plurality of layers of deposited material. In some examples, the method may include depositing a plurality of sequential layers to form an article having a desired shape. In particular, the method may include using an additive manufacturing process (which may also be referred to as '3D printing') to transform the granules in successive layers of deposited material. In particular, the method may include transforming the granules into the deposited material by means of a laser device, in which the laser beam may have sufficient power to melt the granules adjacent a body or preceding layer.

Viewed from a second aspect there is provided a granule for use in a disclosed method of coating a body, comprising silicon (Si), a source of carbon (C), a source of chromium (Cr), and iron group metal selected from the group consisting of iron (Fe), cobalt (Co) and nickel (Ni); in which the relative quantities of the Si, C and Cr are such that a molten phase comprising the Si, C, Cr and the iron group metal will form at a melting temperature of less than 1,300 degrees Celsius when at least a threshold quantity of the iron group metal is available to the Si, C and Cr; and the granule comprises substantially less than the threshold quantity of the iron group metal. The source of carbon and chromium may be in elemental of chemical compound form.

Example granules may be as described previously in relation to the method of coating a body.

Viewed from a third aspect, there is provided a method of making a plurality of granules for use in a disclosed method of coating a body, the method including combining silicon (Si), a source of carbon (C), a source of chromium (Cr), and a source of iron group metal with binder material in a liquid medium to provide slurry; the relative quantities of the Si, C and Cr being such that a molten phase comprising the Si, C, Cr and the iron group metal will form at a melting temperature of less than 1,300 degrees Celsius when at least a threshold quantity of the iron group metal is available to the Si, C and Cr; the content of the iron group metal in the slurry being substantially less than the threshold quantity; drying the slurry to form an aggregation of powder grains; subjecting the aggregation to a first heat treatment at a first temperature sufficiently low that substantially no liquid phase sintering takes place among the powder grains, and sufficiently high that binder material is removed from the aggregation and sufficient (solid state) sintering occurs among the powder grains for a substantial portion of the powder grains to be joined to each other; subjecting the aggregation to a second heat treatment at a second temperature that is substantially higher than the first temperature; and breaking up the sintered body to provide the plurality of granules.

In some examples, the second temperature may be sufficiently high for liquid phase sintering to occur among the powder grains to form a sintered body.

In some examples, the method may include breaking up the aggregation after first heat treatment to provide a plurality of un-sintered granules having sizes of 50 to 500 microns, before combining them and subjecting them to the second heat treatment.

In some examples, the method may include breaking up the sintered body and screening the granules to provide a plurality of granules having sizes of 50 to 500 microns.

In some examples, the method may include combining tungsten carbide grains into the slurry.

In some examples, the binder material may comprise polyvinyl compound material including a hydroxyl group.

In some examples, the first temperature may be 900 to 1,050 degrees Celsius, and or the second temperature may be 1,050 to 1,200 degrees Celsius.

A coating produced by thermal spraying, laser cladding or electron beam welding may be chemically or metallurgical fused to the body. In some examples, the coating may be attached to the body by means of an intermediate layer containing a combination of deposited material and material from the body.

In some examples, the granules may be suitable for depositing a hard layer of material having hardness substantially greater than that of the steel comprised in the body. The deposited material may form a layer that is capable of reducing the rate of corrosion and or mechanical wear of the tool body in use.

BRIEF DESCRIPTION OF THE DRAWINGS

Non-limiting examples will be described below with reference to the accompanying drawings, of which

DETAILED DESCRIPTION

Figure 1:
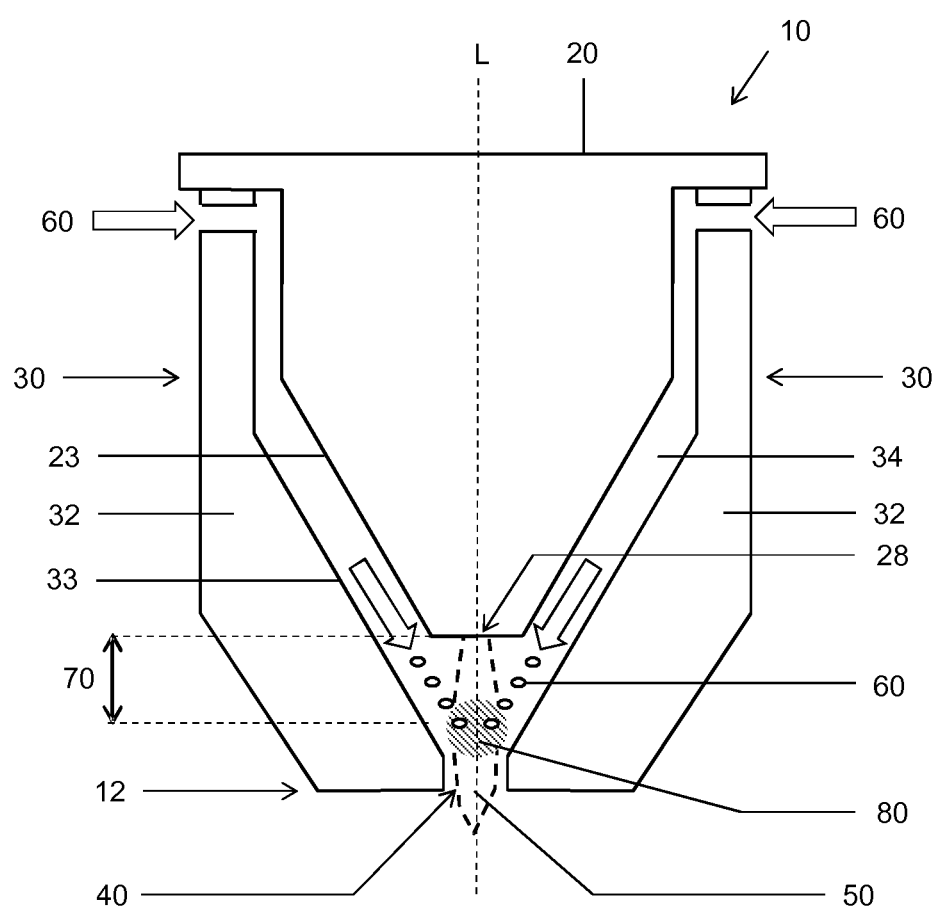
FIG. 1 shows a schematic cross section view of an example thermal spray assembly in the assembled state, in use.

With reference to FIG. 1, an example thermal spray assembly 10 (shown in the assembled state, as a thermal spray device 10) for transforming precursor material 60 into a layer of deposited material joined to a substrate body (not shown); comprising a plasma torch 20 and a feeder mechanism 30, configured such that the plasma torch 20 is capable of producing a plasma jet into a plasma region 50, to be occupied by the plasma jet and to extend from the plasma nozzle 28 in use. The feeder mechanism 30 is capable of guiding the granules 60 into the plasma region 50. The feeder mechanism 30 is capable of providing a feeder orifice 70 when in an open condition (as shown in FIG. 1) and comprises a guide chamber 34 and a moveable guide mechanism 32. The feeder mechanism 30 is configured such that the guide chamber 34 is capable of guiding the granules 60 to the feeder orifice 70, through which the granules 60 can move from the guide chamber 34 and enter the plasma jet in the plasma region 50 at a variable mean distance from the plasma nozzle 28 in response to movement of the guide mechanism 32.

The arrangement of the feeder orifice 70 is variable, such that the granules 60 can be selectively fed into any of various zones within the plasma region 50, having different respective mean axial distances from the plasma nozzle 28 (an example zone 80 is illustrated in FIG. 1). In other words, the granules 60 can be fed into a zone 80 of the plasma region 50 at a selected axial distance from the spray end 12 of the plasma torch 20 from which the plasma jet is emitted through the plasma nozzle 28. In some example arrangements, a longitudinal axis L may be defined by a cylindrical axis of the plasma torch 20, the plasma jet (in use), the plasma nozzle 28, a spray orifice 40 formed by the guide mechanism 32 or the feeder mechanism 30, or more than one of these features arranged coaxially. For example, the longitudinal axis may lie coaxially with the spray orifice 40 and the plasma torch 20.

In the particular example illustrated in FIG. 1, the guide mechanism 32 may be a moveable containment housing configured to accommodate part of the plasma torch 20 depending from the spray end 12. The housing 32 may be axially moveable relative to the plasma torch 20 and the arrangement of the feeder orifice 70 may be variable in response to the movement of the containment housing 32 along a longitudinal axis L through the spray orifice 40 and aligned with the plasma jet in use. The area defined by the feeder orifice 70 will be variable in response to movement of the containment housing 32, the axial length of the feeder orifice 70 being variable in response to movement of the containment housing 32. For example, the feeder orifice 70 may be capable of being varied between 0 and 0.5 millimetres; the distance of 0 mm corresponding to a closed condition of the thermal spray assembly 10 not shown in FIG. 1, in which the containment housing 32 will contact the plasma torch 20 and prevent the granules 60 from being fed into the plasma jet. In this example, the feeder orifice 70 extends circumferentially all the way around the plasma region 50 and the feeder mechanism 30 is capable of introducing the granules 60 into the plasma jet from converging directions extending azimuthally all the way around the plasma region 50.

In the example shown in FIG. 1, the guide chamber 34 is formed between the plasma torch 20 and the containment housing 32, extending circumferentially around the plasma torch 20. The containment housing 32 comprises a conical inner surface 33 spaced apart from a conical outer surface 23 of the plasma torch, forming the guide chamber 34 between them. The containment housing 32 and the plasma torch 20 are substantially coaxial along the longitudinal axis L. In some examples, the cone angle defined by the inner conical surface 33 of the containment housing 32 may be greater than that defined by the conical outer surface 23 of the plasma torch 20, resulting in the guide chamber 34 between them becoming narrower with increased proximity to the feeder orifice 70.

Figure 2:
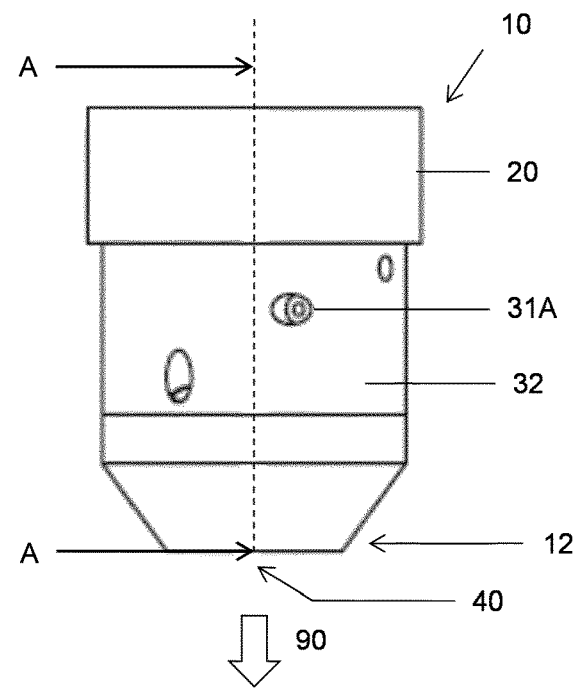
FIG. 2 shows a schematic side view of an example of an example plasma transferred arc (PTA) thermal spray assembly in the assembled state.

FIG. 2 shows a side view of an example thermal spray assembly 10 in the assembled state. It comprises a plasma torch 20 and a moveable containment housing 32 (the guide mechanism in this example), a part of the plasma torch 20 (not visible in FIG. 2) being housed within a cooperatively configured cavity formed by the containment housing 32. An inlet orifice 31A is provided for granular precursor material to be introduced into the feeder mechanism and subsequently conveyed into a plasma jet (not shown) generated by the plasma torch 20 to produce a jet 90 comprising the plasma and material ejected from a spray orifice 40 at a spray end 12 of the thermal spray assembly 10.

Figure 3:
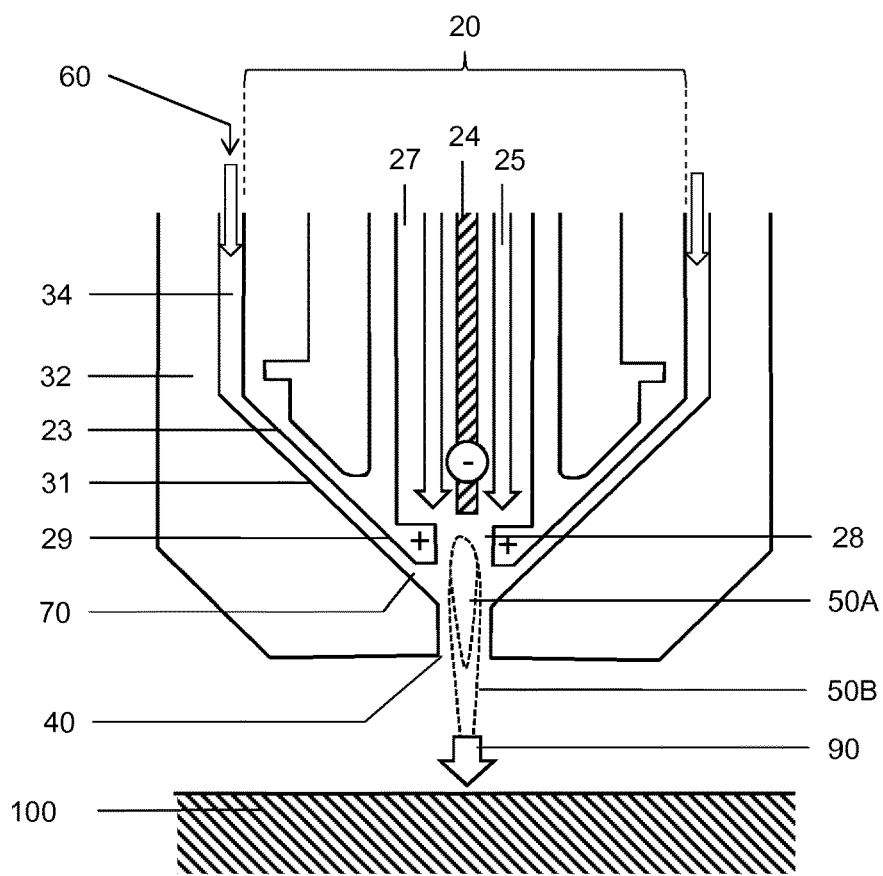
FIG. 3 shows a schematic cross section view A-A of the example plasma transferred arc thermal spray assembly shown in FIG. 2, in use.

FIG. 3 schematically illustrates the operation of a plasma transferred arc (PTA) thermal spray assembly for depositing material onto a substrate 100, in which a potential difference is established between a cathode 24 and surrounding anode 29, as well as the substrate 100. In the particular example shown, part of the plasma torch 20 is located within a cavity formed by a moveable containment housing 32 (the guide mechanism in this example), configured such that an inner surface 31 of the containment housing 32 is spaced apart from an outer surface 23 of the plasma torch 20 to provide a guide chamber 34 through which granular precursor material 60 can be transported towards a feeder orifice 70 provided by the feeder mechanism 30 in the open condition, and ultimately into a pilot plasma 50A, and a transfer plasma 50B, in use. The plasma torch 20 and the containment housing 32 are configured such that the feeder orifice 70 is located proximate a plasma nozzle 28 (which may also be referred to as a 'constrictor nozzle') of the plasma torch 20. The plasma nozzle 28 and the spray orifice 40 may be coaxial such that a pilot plasma 50A generated proximate the constrictor nozzle 28 can project into (or through) the spray orifice 40 and towards the substrate body 100.

The plasma torch 20 may comprise a central cathode 24, which may comprise tungsten (W) metal, and a plasma nozzle 28 at least partly surrounding the cathode 24 and defining at least part of a chamber 27 within which the cathode 24 is located, the cathode 24 and plasma nozzle 28 configured to be capable of generating an electrical arc between them. In use, inert gas 25 such as argon (Ar) will flow past the cathode 24 towards the plasma nozzle 28. The cathode 24, plasma nozzle 28 and chamber 27 are configured such that the inert gas 25 can be ionised and a pilot plasma jet 50A generated proximate the plasma nozzle 28, the pilot plasma jet 50A projecting outwards from the chamber 27, into the spray orifice 40 and towards the substrate 100. When the thermal spray assembly is positioned sufficiently near the substrate 100 and operating conditions are achieved, a transfer plasma jet 50B will be generated and extend between the cathode 24 and the substrate 100, projecting beyond the spray orifice 40. The temperature within the pilot plasma jet 50A may be about 15,000 degrees Celsius and that within the transfer plasma jet 50B may be about 3,000 to about 4,000 degrees Celsius. In general, the temperature within the plasma jet 50A, 50B will vary substantially at different axial positions in the plasma jet, being different axial distances from the plasma nozzle 28.

In general, precursor material 60, which may be in in granular form, and which will likely have been selected such that it can be transformed by the thermal spray operation into the material to be deposited onto the substrate 100. In use, the granules 60 will be introduced into the thermal spray assembly and conveyed into the guide chamber 34, in which it may be further conveyed along convergent paths towards the feeder orifice 70 and ultimately the plasma jet 50B. The flux of the granules 60 converging on the plasma jet 50B will generally be controllable. As used herein, a flux of the granules can be expressed in terms of number of granules passing through a plane per unit time, and incorporates aspects of velocity and spatial density of the granules. The flux of granules 60 injected into the plasma jet 50B will be affected by the area defined by the feeder orifice 70, the density of the granules 60 within the carrier gas and the velocity of the granules 60 towards the plasma jet 50B. The velocity of the granules 60 can be controlled by the flow rate of the carrier fluid and a convergent configuration of the guide chamber 34.

When the granules 60 are injected into the plasma jet 50B, their temperature will increase very rapidly, potentially permitting the precursor material to undergo phase changes and chemical reactions as may be necessary for desired material to be deposited onto the substrate 100. A jet 90 of material may be ejected at relatively high velocity from the thermal spray assembly towards the substrate 100. When the material strikes the substrate 100, it may tend to 'splat' onto the substrate, begin cooling and, depending on the reaction and phase change kinetics, form the desired material in the solid state, attached to the substrate 100.

It will likely be important to control parameters such as the composition and mechanical properties of the granules, the flow rate of the carrier fluid, the number density of the granules within the carrier fluid, the flux of the granules injected into the plasma, the potential difference between the cathode and anode and substrate, the electric current of the pilot and transfer plasma arcs, the flow rate of the inert gas, the dispersion of the granules azimuthally about the plasma torch and the feeder orifice, and the configuration of the guide chamber.

Figure 4A:
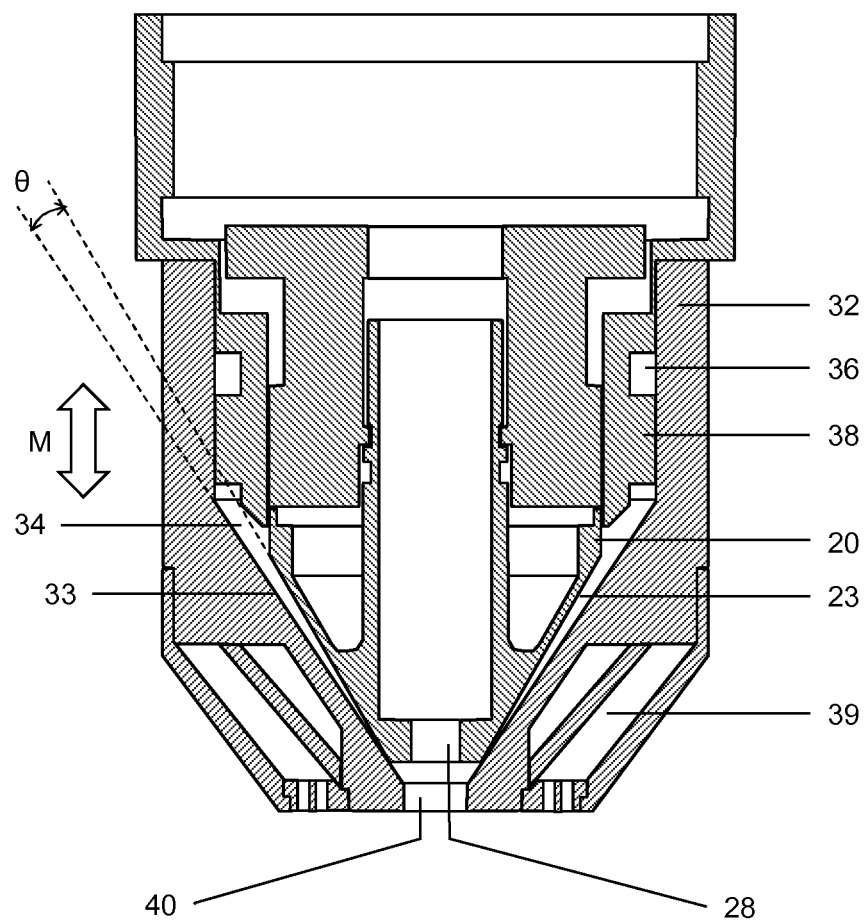
FIG. 4A shows a schematic cross section view of an example thermal spray assembly in the assembled state, in the closed condition.
Figure 4B:
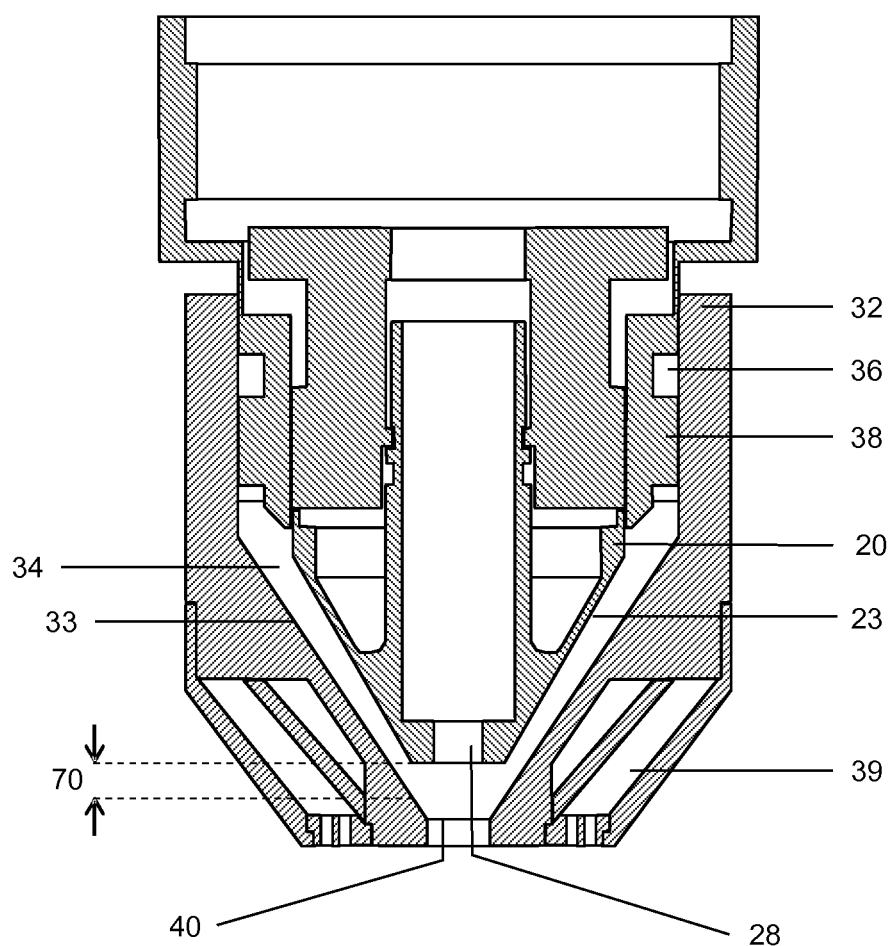
FIG. 4B shows the example thermal spray assembly in an open condition, as in use.

With reference to FIG. 4A and FIG. 4B, an example thermal spray assembly in the assembled state (in other words, a thermal spray device) can be placed in a closed condition, as shown in FIG. 4A, or an open condition, as shown in FIG. 4B, by adjusting the position of the containment housing 32 (the moveable guide mechanism, in the illustrated example) in one of the directions indicated by M. In other example arrangements, the containment housing 32 may be moveable in other directions, such as rotationally and or laterally. The containment housing 32 can be moveable with respect to the plasma nozzle 28, its position capable of being adjusted towards or away from the plasma nozzle 28 and the exterior surface 23 of plasma torch 20, thus decreasing or increasing the volume of the guide chamber 34 and consequently the potential flux of granular precursor material towards the plasma jet in use. The thermal spray assembly may be provided with an adjustment mechanism (not shown) to perform this adjustment.

In the closed condition as shown in FIG. 4A, granular precursor material (not shown) that may be in the guide chamber 34 will be unable to exit the guide chamber 34 and move toward the spray orifice 40 and the plasma region (not shown). In the example shown in FIG. 4A, this may be achieved by adjusting the position of the containment housing 32 such that at least a part of the interior surface 33 of the containment housing 32 abuts at least part of the exterior surface 23 of the plasma torch 20 proximate the spray orifice 40, thus reducing the space between them substantially to zero. In the particular example shown in FIG. 4A, the interior surface 33 of the containment housing 32 and exterior surface 23 of the plasma torch 20 proximate the spray orifice 40 are both substantially cone shaped, each defining a somewhat different cone angles, that of the former being greater than that of the latter by an angle $2\theta$. In some examples, $2\theta$ may be about 7.4 degrees and $\theta$ may be 3.7 degrees. In other words, the guide chamber 34 may converge towards the spray orifice 40. In the closed condition, these mutually converging conical surfaces 33, 23 may abut each other proximate the spray orifices 40. When the feeder mechanism is in the open condition as illustrated in FIG. 4B, a likely effect of the narrowing guide chamber 34 towards the spray orifice 40 may be to accelerate and focus the flux of granules.

In the open condition as shown in FIG. 4B, the containment housing 32 has been adjusted to a position such that its interior surface 33 is further away from the corresponding exterior surface 23 of the plasma torch 20. A feeder orifice 70 will thus be provided between these surfaces 23, 33 at the narrowest spacing between them, proximate the spray orifice 40 and the plasma region (not shown). The feeder orifice 70 will permit granules to pass out of the guide chamber 34 and into the plasma region, where a plasma jet will be present in use (in a PTA device, this will be the transfer plasma). In the example shown, the feeder orifice 70 will be generally cylindrical in shape and coaxial with the plasma torch 20. The flux of granules arriving at the plasma region in use can be thus controlled by moving the containment housing 32 axially relative to the plasma torch 20 and consequently varying the area and axial spacing of the feeder orifice 70 by varying the position of the lower end of the feeder orifice 70, formed by part of the interior surface 33 of the containment housing 32.

In some examples, granules may be introduced continuously into the thermal spray assembly by means of a fluid carrier medium, such as Ar gas, within which the granules may be dispersed and suspended. The granules and the carrier fluid may be distributed by the feeder mechanism to disperse the granules azimuthally within the guide chamber 34 and consequently azimuthally about the spray orifice 40 and the plasma jet in use. A shielding gas chamber 39 will provide gas through a plurality of orifices surrounding the plasma jet in use for shielding the plasma jet and the material being sprayed from oxygen in the air.

Figure 5:
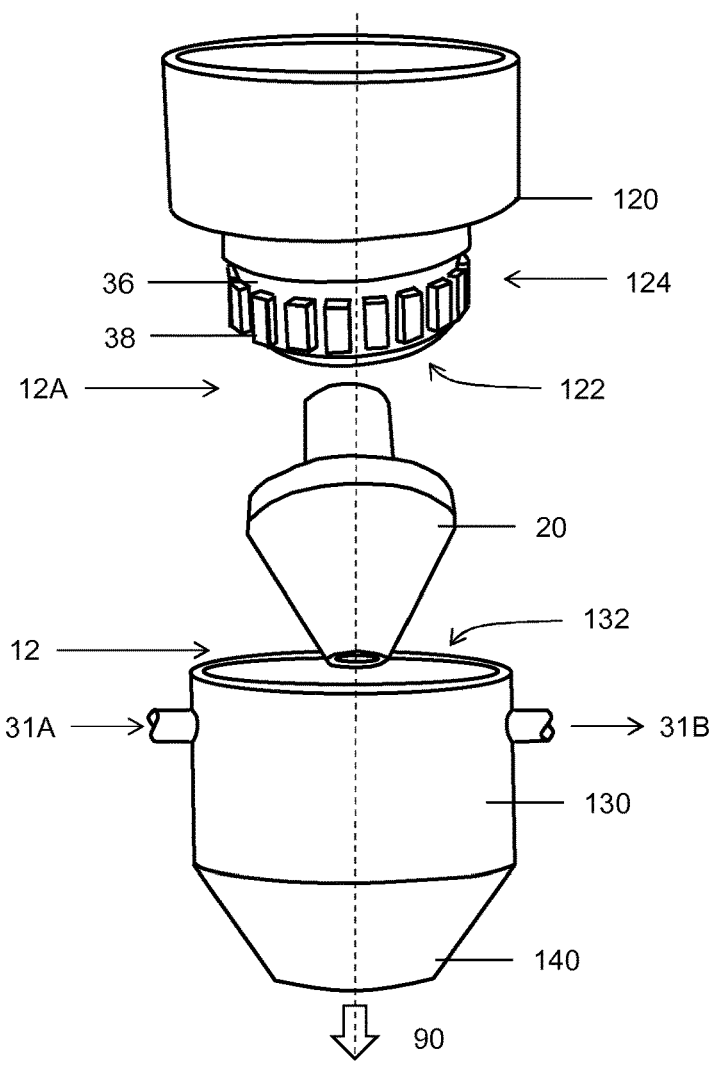
FIG. 5 shows a schematic side perspective drawing elements of a thermal spray assembly in partly unassembled state.
Figure 6:
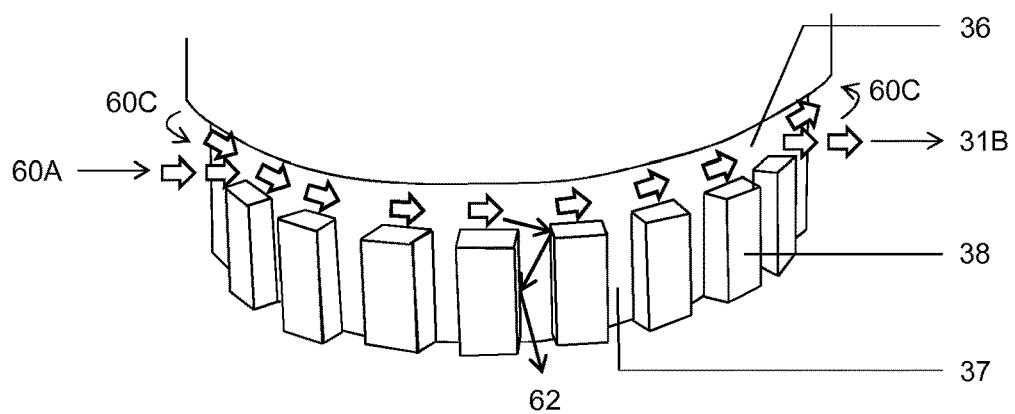
FIG. 6 shows a schematic side perspective view of part of an example feeder mechanism for an example thermal spray assembly.

With reference to FIG. 5 and FIG. 6, an example the thermal spray assembly may comprise first, second, third and fourth elements 20, 120, 130, 140 in which the first element consists of the plasma torch 20. The first element 20 may be attachable to the second element 120 comprising an upper housing cavity 122 by a threaded attachment mechanism depending from an attachment end 12A of the plasma torch 20. A third element 130 may comprise a lower housing cavity 132 for accommodating an opposite spray end 12 of the plasma torch 20, and may be configured for housing part 124 of the second element 120. In other words, a part 124 of the second element 120 may be 'sandwiched' between the plasma torch 20 on its inner side, and the wall of the lower housing cavity 132 on its outer side. A fourth element 140 comprising a cooling mechanism and a shielding gas supply mechanism may be configured to accommodate part of the third element 130 and surround the spray end 12 of the plasma torch 20.

The feeder mechanism may comprise certain features of the first, second and third elements 20, 120, 130, when assembled, and the granules will be conveyed through channels and or chambers formed by communicating spaces between these elements. For example, the second element 120 may comprise a circumferential channel, which will define part of a distribution chamber 36 when housed within the housing cavity 132 of the third element 130, which will form a boundary of the distribution chamber 36. The distribution chamber 36 will be capable of guiding granules generally azimuthally around the plasma torch 20. A plurality of mutually spaced-apart deflector structures 38 arranged azimuthally around the plasma torch 20, adjacent the distribution chamber 36, in the form of radial projections from the second housing 120, will deflect circulating granules 60C into deflection channels 37 and guide the deflected granules 62 generally axially into the guide chamber. The third element 130 may comprise an inlet 31A orifice for introducing the granules and a carrier fluid into the distribution chamber 36, and an outlet orifice 31B for permitting carrier fluid and potentially some of the granules to escape from the thermal spray assembly, potentially for re-use.

In use, the granules 60A and carrier fluid may be introduced into the distribution chamber 36 and be guided to circulate within the distribution chamber 36 as circulating granules 60C. An effect of the granules 60C circulating within the distribution chamber 36 will likely be to distribute the granules 60C substantially uniformly around the plasma torch 20 (azimuthally). Some of the circulating granules 60C will strike the sides of the deflector structures 38 and be conveyed along generally axial paths 62 within deflection channels 37, into the guide chamber (not shown in FIG. 5 and FIG. 6). If the deflector structures 38, and consequently the deflection channels 38, are arranged at regular spacing intervals all the way around plasma torch 20, the precursor material granules 60C will likely be introduced into the guide chamber at similarly regular spaced intervals. The uniformity of the flux of granules circumferentially within the guide chamber will likely depend on the widths and number of deflector structures 38, the more numerous and densely packed the deflector structures 38, the more uniformly the granules will likely be dispensed into the guide chamber.

Figure 7:
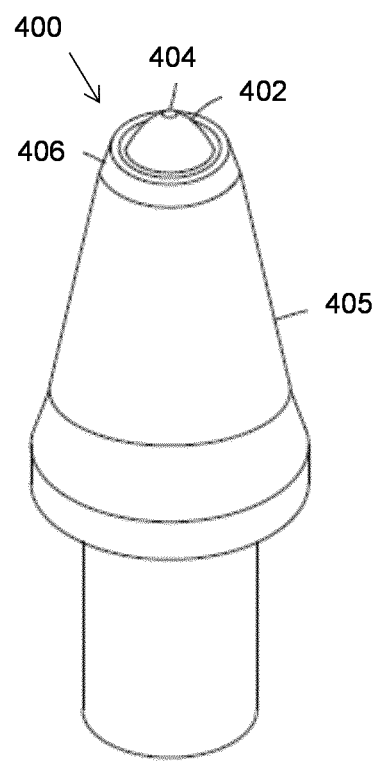
FIG. 7 and FIG. 8 show example pick tools for road milling or mining, each provided with an example protective layer.

With reference to FIG. 7, an example pick tool 400 for mining comprises a steel base 405 and a hard-face layer 406 fused to the steel substrate 405. The hard-face layer may be deposited onto the steel substrate 405 by means of a disclosed thermal spray device. The pick tool 400 may comprise a cemented carbide tip 402 having a strike point 404 and joined to the steel base 405. In some examples the tip 402 may comprise diamond material such as PCD material or silicon carbide-bonded diamond material. The hard-face layer 406 may be arranged around the cemented carbide tip 402 to protect the steel substrate 405 from abrasive wear in use. In use breaking up a rock formation comprising coal or potash, for example, rock material the hard-face layer will likely reduce abrasion of the steel base 405, substantially reducing the risk of premature failure of the pick tool 400.

Figure 8:
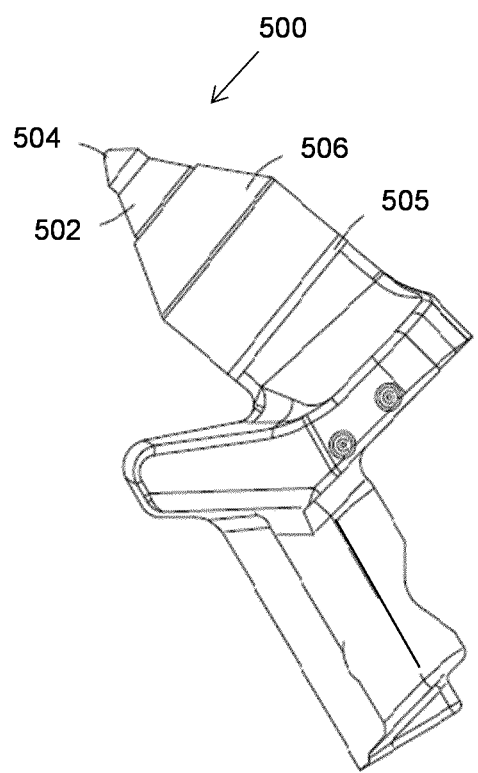
Figure 9:
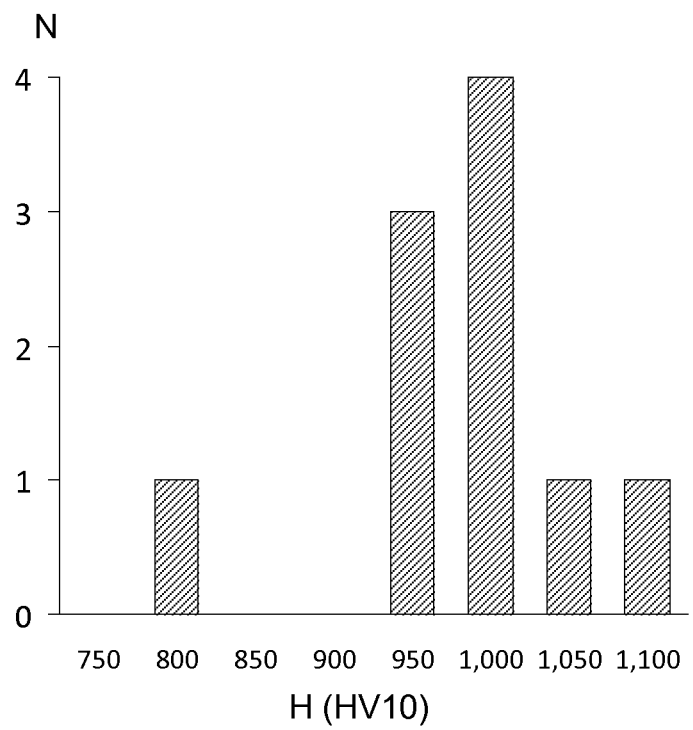
FIG. 9 shows a graph of the number frequency distribution of the hardness of example granules.

With reference to FIG. 8, an example pick tool 500 for a road pavement milling comprises a steel holder 505 provided with a bore, and a strike tip 504 joined to a cemented carbide base 502 that is shrink fit or press fit into the bore. A hard-face layer 506 may be fused to the steel holder 505, arranged around the bore to protect the steel holder body 505 from wear in use. The hard-face layer may be deposited onto the steel holder 505 by means of plasma transferred arc (PTA) thermal spraying, using a disclosed thermal spray device. The strike tip 504 may comprise a PCD structure joined to a cemented tungsten carbide substrate.

The compressive strength of the granules may be measured by selecting a plurality of substantially spherical granules within a relatively narrow size range and subjecting each granule to a compression test, one at a time (since certain mechanical properties of the granules are likely to depend on the granule size). Each granule can be placed between a pair of flat plates, in which one of the plates remains stationary and the other plate is driven against the granule at a constant rate of displacement until the granule fractures (provided that the maximum force with which the plate can be driven is greater than the compressive strength of the granule). The time, plate displacement and force data may be logged during the measurement. The compressive strength of a granule can be calculated from data about its diameter and its deformation (the strain) as function of the applied force (the stress) until the force is sufficiently great to break the granule.

A non-limiting example of thermal spray device and its use to deposit a relatively hard layer of material onto a steel body will be described below in more detail.

A first plurality of granules having combined mass of 200 kg was prepared as follows:

a. Blending: 144 kg tungsten carbide (WC) having mean grain size of 0.8 micron, 30 kg of iron (Fe) powder having mean grain size of about 1 micron, 15 kg of chromium carbide ($Cr_3C_2$) powder having mean grain size of 1 to 2 micron, 6 kg of silicon (Si) powder and 4 kg of paraffin wax and blended by milling the powders together in an attritor mill for three hours, using an alcohol as milling medium and a plurality of cemented tungsten carbide balls having a combined mass of 800 kg to provide precursor material slurry. The slurry was dried to provide blended powder and agglomerations were broken up to provide loose powder.

b. First granulation: The powder was granulated by rolling it in a rotating drum combined with a binder material and then sieved to provide a plurality of granules having a mean size of about 75 to about 225 microns, to provide a plurality of 'green' granules (in other words, granules comprising powder grains held together by means of binder material).

c. Preliminary heat treatment: The green granules were placed into graphite boxes and heated to a temperature of 1,020 degrees Celsius. This temperature was sufficiently low for substantially no liquid phase sintering of the material to take place, and sufficiently high for substantially all of the binder material to be removed and a sufficient degree of solid phase sintering of the powders to provide the granules with sufficient strength to be handled.

d. Second granulation: After the heat treatment, the granules were sieved to select a plurality of the granules having diameter of about 75 to 225 microns.

e. Sintering heat treatment: The selected granules were then again placed into graphite boxes and sintered at a temperature of 1,160 degrees Celsius in vacuum for 45 minutes to permit substantial liquid phase sintering of the granules and provide sintered granules. During the sintering process, while a certain amount of chromium carbide ($Cr_3C_2$) will likely decompose, only a relatively small amount of the WC may dissolve into the binder material. While wishing not to be bound by a particular hypothesis, potentially substantially all of the chromium carbide ($Cr_3C_2$) may dissolve in the liquid binder material and crystallisation of mixed carbide compound material, comprising iron group metal (such as Fe or Co), Cr and C may occur during solidification of the material. The amount of dissolved WC will likely be approximately 5 to 8 mass %, corresponding to at most approximately 1.5 to 2.5 atomic %, which will likely not substantially affect melting temperature of the binder material. If the granules had contained substantially more iron than they did, the risk of substantial melting of the granules would have been high, resulting in a large, hard aggregation of iron-based material by the end of the sintering heat treatment, which would have made it very difficult to break up the aggregation to provide the first plurality of granules. However, if there had been too little iron present in the granules, there would not have been sufficient liquid phase sintering of the material and the granules would very likely lack sufficient strength. For example, if it were attempted to provide and use just one plurality of granules for the thermal spray process, avoiding the need to introduce a further plurality of iron-rich granules, the granules would have needed to comprise about 69 mass % of iron instead of the 15 mass % used in this example, which would have resulted in a hard, iron-based body that would likely have been non-viably difficult to granulate.

f. Third granulation: The sintered granules were hot isostatically pressed (HIP) in an argon (Ar) atmosphere at a pressure of 50 bar, resulting in a compacted body. The compacted body was then broken up and granules having size of about 60 to 180 microns were selected by means of sieving to provide the first plurality of granules.

The granules of the first plurality (which may also be referred to as the 'first granules') were substantially deficient in iron and would not have been viable for thermally spraying and fusing them successfully onto a substrate body, even though the body comprised steel. While it might be theoretically possible to spray the iron-deficient first granules onto the substrate without introducing additional granules comprising Fe, using Fe present in the steel plate on which the granules are to be sprayed, the energy required to do this would likely be very high.

Figure 10:
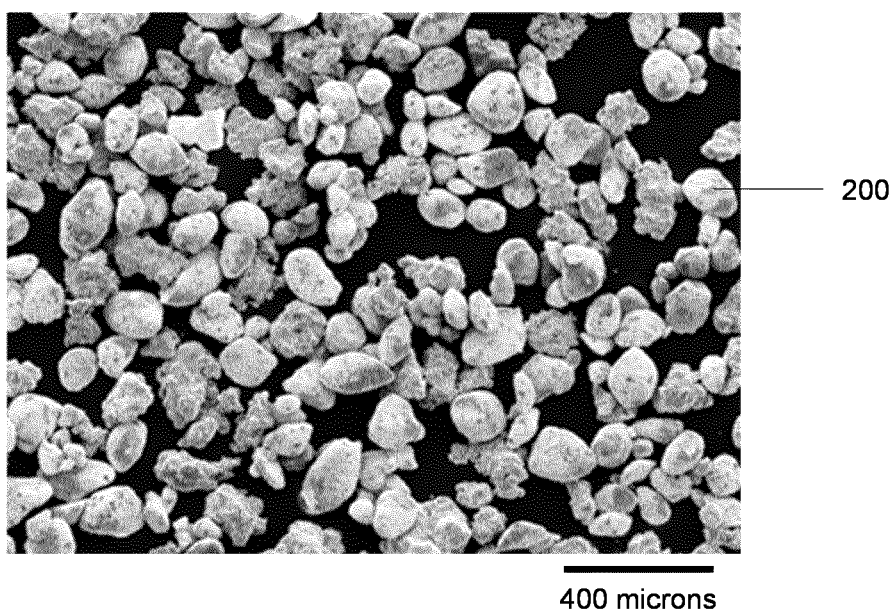
FIG. 10 shows a photograph of a plurality of example combined first and second pluralities of granules.

The size distribution of the first granules was such that the d(10) value was 90 microns, the median size (d(50)) was 141 microns and the d(90) size was 221 microns (in other words, 10%, 50% and 90% of the granules were less than or equal to 90, 141 and 221 microns in diametrical size, respectively). A sample of five granules was randomly selected for destructive mechanical testing. Each granule was placed on a rigid stage and a rigid plate was slowly pressed against the granule at a constant speed, thus compressing it with an increasing force of as little as 50 millinewtons (mN) and a maximum of 2,000 Newtons (N), until the granule broke. Since the mechanical properties of the granules will likely depend on the size of the granule, the tested granules had diametrical size of 125 to 160 microns. And mean diameter of 141±14 microns. The mean failure load of the granules was measured to be 6.0±2.3 Newtons (N) and the mean compressive strength of the granules was 402.6±187.9 megapascals (MPa), taking loading deformation of the granules into account. The number frequency N distribution of the granules as a function of Vickers hardness H (HV10) is shown in FIG. 10. The method used to manufacture the granules succeeded in producing granules that were relatively hard, dense and strong.

A second plurality of granules consisting of commercially Fe grains prepared by means of water atomisation was provided (in particular, Hoganas™ ABC 100.30 was used) and sieved to extract the grains falling in the size range of about 60 to 180 microns. The compressive strength of the Fe granules of the second plurality was not measured because of their irregular shape as a result of the water atomisation (if the second granules had been made by means of gas atomisation, they would likely have been more spherical and their compressive strength might have been measured; the flowability of the second plurality of granules would likely have been enhanced to some degree as well).

Figure 11:
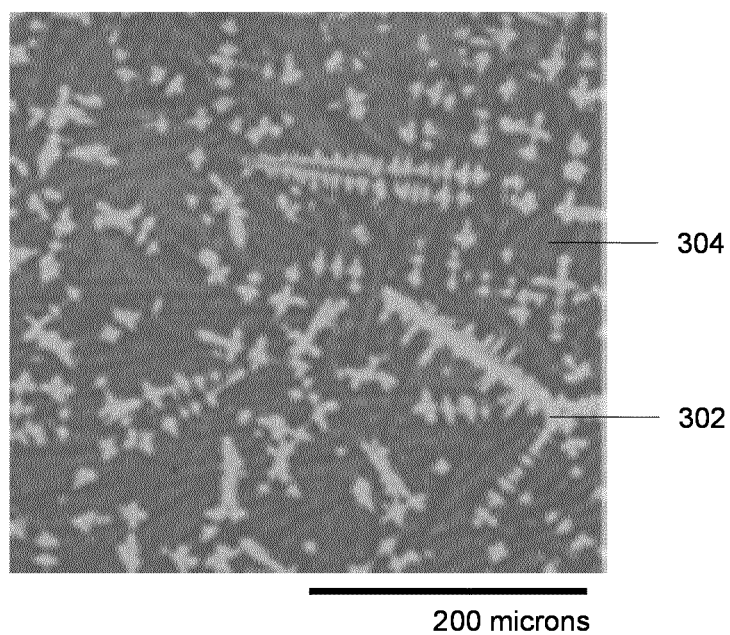
FIG. 11 shows a scanning electron micrograph (SEM) image of example material deposited by means of a thermal spray assembly.

The first and second granules were blended together at a mass ratio of 75:25 to provide a combined plurality of granules comprising about 35 weight percent Fe overall. FIG. 11 shows a micrograph of a combination of the first 200 and second pluralities of granules. The composition of each of the granules of the first and second pluralities are summarised in table 1. The blended granules were suitable for being thermally sprayed, having a good balance of ease of welding on the one hand and hardness on the other.

The combined granules were then spayed onto a steel plate by means of the example plasma transferred arc (PTA) thermal spray device of a kind described above with reference to FIG. 4A and FIG. 4B, thus depositing a relatively hard and wear resistant layer of material onto it. The steel plate was 100 millimetres (mm) long, 60 mm wide and 10 mm thick. The axial position of the containment housing 32 relative to the plasma torch 20 was adjusted such that the feeder orifice 70 defined an axial gap of 0.2 mm to 0.4 mm between containment housing 32 and the plasma torch 20. Other operating parameters of the PTA thermal spray device were as summarised in table 2.

TABLE 1

| Material | 1st Granules Mass, kg | 1st Granules Mass, % | 2nd Granules Mass, % | 25% 1st Granules + 75% 2nd Granules combined, mass % | |
|---|---|---|---|---|---|
| Fe | 30 | 15 | 100 | 69 | Composition of the binder material in which the WC grains are dispersed = 19 mass % Cr + 3 mass % C |
| Cr | | | | 19 | |
| C | | | | 3 | |
| Si | 6 | 3 | | 9 | |
| $Cr_3C_2$ | 15 | 7.5 | | 22 | |
| WC | 144 | 72 | | | |
| paraffin wax | 4 | 2 | | | |
| Total | 200 | 100 | 100 | | |

TABLE 2

| Parameter | Value |
|---|---|
| Pilot arc current | 50 amperes (A) |
| Transferred arc current | 145 amperes (A) |
| Granule feed rate | 30 grams per minute (g/min.) |
| Protective gas and feed rate | Argon (Ar), fed at 15 litres per minute (l/min.) |
| Pilot gas and feed rate | Argon (Ar), fed at 2 litres per minute (l/min.) |
| Powder gas and feed rate | Argon (Ar), fed at 8 litres per minute (l/min.) |

The thickness of the deposited layer was about 3 millimetres (mm) and had a hardness of 1,000±100 Vickers units. A micrograph showing the microstructure of the layer is shown in FIG. 12. It comprises dendritic eta-phase carbide phases 302 within a matrix 304, small tungsten carbide (WC) grains and an iron (Fe)-based matrix reinforced with precipitated nano-grains of eta-phase carbide in the form of nano-scale whiskers and nano-scale discs.

The wear resistance of the deposited layer was measured using the ASTM G65 test and compared to those of three different grades of cobalt-cemented tungsten carbide (Co—WC) material, comprising 8, 10 and 15 weight percent (%) cobalt (Co). In this test, three machine tool inserts comprising each of the above mentioned grades of cemented carbide were used to machine the layer of material deposited onto the steel plate in the example described above. When the tool comprising 8 weight percent Co was applied to the deposited layer, substantially the same volume of material (about 3.8 cubic millimetres) was removed from both the tool and the layer, indicating that the wear resistance of the material deposited as described in the example was comparable to that of this grade of cemented carbide material. The volume removed from the cemented carbide grades comprising 10 and 15 weight percent (%) cobalt (Co) were 9.1 $mm^3$ and 12.2 $mm^3$, respectively, indicating that the material comprised in the layer was significantly more resistant to wear than these grades.

In a second example, the relative content of the iron (Fe) was increased to 20 mass %, compared to 15 mass % in the first example described above, the precursor material used to make the granules in the second example comprising 20 mass % Fe, 13 mass % chromium carbide ($Cr_3C_2$), 3 mass % Si and about 64 mass % WC grains. Although it was possible to manufacture and thermally spray the first granules in the second examples, it was substantially more difficult to break up the sintered aggregation produced in the sintering heat treatment step.

In a third example, the relative content of the iron (Fe) was decreased to 10 mass %, compared to 15 mass % in the first example described above, the precursor material used to make the granules in the second example comprising 10 mass % Fe, 6.67 mass % $Cr_3C_2$, 3 mass % Si and about 80 mass % WC grains. Although it was relatively easier to break up the sintered aggregation produced in the sintering heat treatment, it was substantially more difficult to achieve density of the granules.

In a fourth example, the first and second granules as described in the first example were combined in the ratio of 60:40 (as opposed to the ratio of 75:25 in the first example), thus resulting in a substantially larger amount of Fe being included in the combined precursor materials that were thermally sprayed. This was found to result in a substantially softer deposited layer.

In a fifth example, the first and second granules as described in the first example were combined in the ratio of 90:10 (as opposed to the ratio of 75:25 in the first example), thus resulting in a substantially reduced amount of Fe being included in the combined precursor materials that were thermally sprayed. In some cases, this may result in a substantially softer deposited layer. However, the exact composition of the substrate and the degree to which it may melt on contact with the material being deposited.

In some examples, a steel substrate may be relatively small and or thin and a relatively low level of power may likely need to be applied in the thermal spraying process in order to avoid or reduce the risk of damaging the steel. In such cases, molten iron group metal from the steel will unlikely be available for reacting with the sprayed material and a relatively higher proportion of the second plurality of granules (comprising the iron group metal) will likely be used.

In other examples, the steel substrate may be relatively large and therefore it may be possible to apply a relatively high level of power in the thermal spraying process. In such cases, the higher power may result in a film of molten iron group metal from the steel forming on the substrate, which may be available for reacting with the sprayed material. It may also be less likely for larger substrates to be significantly distorted by the increased heating due to the higher thermal spray power. In such cases, a relatively lower proportion of the second plurality of granules (comprising the iron-group metal) may be used.

In general, the combination of the first and second pluralities of granules, in which the second plurality comprises or consists of iron group metal such as Fe or Co may be adjusted depending on the shape, size and composition of the substrate being coated. If too much molten iron group metal is made available at the substrate surface, the coating may not be sufficiently hard. For example, excessive iron group metal may arise if the proportion of the granules comprising or consisting of the iron group metal is too high, and or if too much melting of the substrate occurs as a result of excessively high thermal spraying power.

Various potential aspects of at least certain of the disclosed example arrangements, granules and methods will be briefly discussed.

Certain disclosed example precursor material, comprising various combinations of chemical elements and or compounds and being potentially suitable for coating a body, may form a molten phase (in other words, a phase substantially in the liquid state) at a relatively low melting temperature of less than 1,300 degrees Celsius (a eutectic phase temperature may be less than 1,300 degrees Celsius). This may give rise to certain technical challenges when using the precursor material in certain coating processes that involve heating the precursor material. For example, premature formation of a molten phase may result in its deposition on the coating apparatus. Certain examples of the disclosed method have the aspect of improving control over the formation of the molten phase and thus potentially improving control and performance of the thermal deposition process. Example disclosed methods involve combining a plurality of different sources of chemical components of the precursor material in such a way that the molten phase will form within a desired region. For example, the chemical components of the precursor material may be separated in two or more pluralities of feedstock granules, the granules of each plurality having a different chemical composition and relatively higher melting temperature than the combined chemical components.

Certain example disclosed methods may include providing the precursor material as at least two pluralities of feedstock granules and heating a combination of the granules to form the molten phase, in which the granules (and potentially other sources of a chemical component of the precursor material) may have desired mechanical or other properties, such as hardness, toughness and or flow characteristics. For example, relatively hard granules may exhibit improved flow behaviour when being guided into position for heating, and example disclosed methods of making the granules may have the aspect of producing relatively hard and strong granules. In certain example coating methods, the risk of molten phase material becoming attached to the coating apparatus may be reduced by adjusting the apparatus and operating conditions such that the molten phase will form sufficiently far away from the apparatus. The arrangement of the apparatus and or the operating parameters may be influenced by the mean size of the granules and the variance in size. An aspect of the granules being relatively hard and strong may be reduced risk of them breaking, thus enabling improved control of the coating process.

In examples where the precursor material is provided as more than one plurality of granules having different composition, the likelihood that granules of all pluralities will have similar flow characteristics will likely be enhanced if the granules of different pluralities have similar size characteristics. Sufficiently large granules may be more likely to flow uniformly and predictably, and the risk of gains becoming lodged in corners or small spaces within the coating apparatus will likely be reduced. If the grains or granules are too large, they may not be able to pass through orifices, channels and chambers of the coating apparatus, potentially resulting in blockages.

In certain disclosed examples, it may likely be easier to provide harder and stronger granules when the chemical components of the precursor material are separated into more than one plurality of granules. In particular, where iron group metal is a major chemical component of the precursor material, a first plurality of granules can be provided substantially deficient in the iron group metal, and disclosed example methods may be used to provide such granules having relatively high hardness and compressive strength. If the content of the iron group metal in granules is too high, then the intermediate aggregations of powders produced in the method may be susceptible to undesired melting in a heating step of the granule manufacture process. When the aggregation is cooled and the metal solidifies, it may be very difficult to break up the resulting solidified aggregation to provide granules. If the content of the iron group metal in the granules is too low, the aggregation may have insufficient strength and it will likely be difficult to produce granules having sufficient strength and desired size. A second plurality of hard and strong grains consisting of the iron group metal may be provided by known methods or procured commercially.

Metal-based coatings produced using precursor material having a relatively low melting temperature of less than 1,300 degrees Celsius may have the aspect of being relatively dense and hard, having little or no porosity and potentially comprising carbide grains (which may be combined with the precursor material). In some examples, the coating produced by the disclosed method may have substantially different properties from those of the body. For example, the coating may be harder or be more resistant to wear than the body, which may comprise steel. Example coatings may protect the body from wear or corrosion in use.

Other aspects of disclosed example coating methods may include enhanced uniformity coating over relatively long periods of time. For example, coating methods including plasma transferred arc thermal spraying may exhibit reduced plasma and pilot current in operation, making it possible for deposit relatively thin layers (4-5 mm) and vary parameters as desired. Example thermal spray methods may exhibit increased rate of delivery of powder to the plasma jet (in terms of mass per unit time), making it feasible to deposit layers of up to 7 to 8 mm in a single operation. Disclosed example thermal spray devices and methods of thermal spraying or laser cladding will likely have the aspect that relatively large bodies, having a cross section dimension of at least about 30 centimetres (cm), and or bodies having relatively complex shapes can be coated relatively efficiently with protective material, particularly but not exclusively for protection from abrasive or corrosive wear. It will likely be possible to provide coatings having relatively uniform thickness and quality.

Examples of the disclosed method may have the aspect that relatively hard, abrasion resistant and dense material can be deposited. In examples where a plurality of layers have been deposited over one another to form articles, such as in an additive manufacturing process, the resulting article may have these aspects. While wishing not to be bound by a particular theory, the relatively low eutectic temperature of the precursor materials may allow relatively hard and dense articles comprising carbide compound material to be manufactured by means of a 3D printing process.

Certain terms and concepts as used herein will be briefly explained below.

As used herein, thermal spraying processes include coating a body with a layer of material, in which molten phase material produced by heating precursor material (which may also be referred to as coating precursor, or 'feedstock') is sprayed onto a surface, thus depositing coating material onto the surface of the body. The feedstock material can be heated by various means, such as plasma or arc, or chemical means. In general, thermal spraying can potentially provide relatively thick coatings of about 20 microns to several mm (depending on the process and feedstock) over a relatively large area at high deposition rate. The precursor material may be in granular form, and will be heated to a molten or semi-molten state and finely divided (also referred to as 'atomised') droplets of the molten or semi-molten material are accelerated towards the body to be coated. The coating will likely arise from accumulation of the droplets on the body, which solidify as a plurality of flattened grains, which may be referred to as lamellae. Various operating parameters are likely to affect the properties of the coating, including the composition, form and physical properties of the precursor material, the plasma gas composition and flow rate, the energy input, the distance between the torch and the substrate (which may also be referred to as the offset distance) and cooling of the substrate.

In arc plasma spraying methods, a high temperature plasma jet emanating from a plasma torch can be generated by arc discharge and ionisation of a suitable gas passing between an anode and cathode. The temperature within the plasma will likely vary and may exceed about 10,000 degrees Celsius. Feedstock comprising precursor material may be in the form of powder or granules and conveyed by a feeder mechanism into the arc plasma. A tungsten electrode may be located within a chamber of the plasma torch and inert gas may be forced to flow past the electrode and through an orifice of a constrictor nozzle, producing a plasma jet extending through the orifice. Shield gas may be introduced surrounding the constrictor nozzle to protect the plasma jet from the ambient atmosphere. The feedstock granules may be provided dispersed in an inert carrier gas such as argon (Ar) and guided into the plasma jet. Other methods of thermal spraying include detonation spraying, wire arc spraying, flame spraying and high velocity oxy-fuel coating spraying (HVOF).

In plasma transferred arc (PTA) processes, a 'pilot arc' can be generated between a central electrode and a surrounding water-cooled nozzle comprising copper, and a 'transferred arc' can be generated between the electrode and the body being coated. Relatively high plasma arc density can be achieved in PTA processes by the ionisation of argon (Ar) gas passing through the pilot arc, which usually burns permanently during thermal spraying operation. The temperature of the transferred arc can be increased by 'throttling' to obtain a plasma column having a temperature of about 8.000 to 18.000 degrees Celsius and the transferred arc plasma jet may cause a surface region of the body to melt if it comprises metal, such as steel. An arc ignition device will likely be used to generate a spark between the cathode and the anode proximate the constrictor nozzle, so that a pilot plasma (which may also be referred to as a 'non-transferred arc') will be generated when the gas flows through the constrictor nozzle. The pilot arc will form a low resistance pathway between the cathode and the substrate to facilitate the subsequent generation of a transfer arc. PTA operating parameters can be adjusted to provide layers having thickness from about 1 to at least about 3 mm, at a rate of 1 to 13 kilograms per hour (kg/h) depending on the torch, powder and application.

As used herein, a laser cladding process involves welding precursor material onto a body by means of a laser device, and may be viewed as being a complementary coating technology to plasma transferred arc (PTA) processes. Both methods will include rapidly heating feedstock material to form a molten phase, which will be deposited onto the surface of a body. For example, the feedstock may be heated to a temperature of about 2,000 degrees Celsius within less than a second or less than about 5 seconds.

As used herein, '3D printing', which may also be referred to as 'additive manufacturing' or 'rapid prototyping', is a process of making objects of almost any shape by sequential coating layers of deposited material (in other words, a plurality of coatings may be deposited, one over another to form a three dimensional article). The distribution of materials in each layer will be configured according to the position of the layer in the series of layers and the shape of the object to be made. The distribution of materials will normally be controlled by a computer program. A '3D printer device' will be capable of depositing the materials in the layers and according to specific configurations under computer control, and may comprise robotic capability. Various kinds of additive processes are possible, differing in the way in which the layers are deposited. Example processes that involve heating precursor material include selective laser melting (SLM), direct metal laser sintering (DMLS), selective laser sintering (SLS) and fused deposition modelling (FDM). If the material feedstock for the additive manufacturing process comprises metal or metal alloy material in granular form, then direct metal laser sintering (DMLS) or selective laser sintering (SLS) may likely be suitable. Electron-beam melting (EBM), selective laser melting (SLM) may be suitable, depending on the type of metal or alloy material. One approach to 3D printing involves the selective fusing of granular materials to the underlying layer, which will normally involve the targeted heating of a layer of granules, which may be achieved by means of a laser device (selective laser sintering) and direct metal laser sintering (DMLS). In selective laser melting (SLM), the granules will be melted rather than sintered using a high-power laser to create

The invention claimed is:

1. A method of coating a steel body, the method including:
providing a plurality of granules from a first source, each granule comprising powder grains held together by a binder material, the powder grains consisting of tungsten carbide (WC), silicon (Si), carbon (C), chromium (Cr) and iron (Fe); in which the relative quantities of the WC, Si, C and Cr are such that a molten phase of Si, C, Cr and Fe will form at a melting temperature of less than 1,300 degrees Celsius only when at least a threshold quantity of Fe is accessible to the WC, Si, C and Cr; each granule comprising substantially less than the threshold quantity of Fe;
providing a second plurality of granules from a second source, the second source granules consisting of Fe in granular form, the first source granules and the second source granules being provided as separate feedstock granules;
determining a ratio of first source granules to second source granules taking into account the shape, size, and composition of the body to be coated;
blending the ratio of the first source granules and the second source granules to form a blended granule mixture such that at least the threshold quantity of Fe will be accessible to the WC, Si, C and Cr and such that the blended granule mixture consists of WC, Si, C, Cr, and Fe;
heating the blended granule mixture to at least the melting temperature to form the molten phase then applying the molten phase to the body; and
removing the heat to allow the molten phase to solidify and to provide the coated body.

2. The method as claimed in claim 1, in which the melting temperature is at most 1,280 degrees Celsius.

3. The method as claimed in claim 1, including using a laser cladding process, in which the heating is achieved by means of a laser beam; an electron beam process, in which the heating is achieved by means of an electron beam; or an arc plasma spray process, in which the heating is achieved by means of an arc plasma.

4. The method as claimed in claim 1, including using an additive manufacturing process to apply successive layers of a coating onto the body, the layers configured for producing the coating for the coated body.

5. The method as claimed in claim 1, in which the body comprises a further source of Fe.

6. The method as claimed in claim 1, in which the first source granules comprise 20 to 60 percent of a threshold quantity of the iron group metal.

7. The method as claimed in claim 1, wherein the carbon (C) and chromium (Cr) of each first source granule is chromium carbide ($Cr_3C_2$); wherein the mass of the chromium carbide ($Cr_3C_2$) is 1.5 to 7 times the mass of the Si, and the mass of the Fe is 2 to 8 times the mass of the Si.

8. The method as claimed in claim 1, including introducing the blended granule mixture into a feeder mechanism of an arc plasma spray apparatus, and using the apparatus to produce the coating on the body; in which the arc plasma spray apparatus comprises a plasma torch for producing a plasma jet from a plasma nozzle, and the feeder mechanism for guiding the blended granule mixture into the plasma jet in use, and is capable of providing a feeder orifice when in an open condition; the feeder mechanism comprising a guide chamber and a moveable guide mechanism; and configured such that the guide chamber is capable of guiding the blended granule mixture to the feeder orifice, through which the blended granule mixture can move from the guide chamber and enter the plasma jet at a variable mean distance from the plasma nozzle in response to movement of the guide mechanism; the method including adjusting the position of the guide mechanism such that substantially none of the molten phase contacts the apparatus in use.

* * * * *